United States Patent [19]
Harrell

[11] Patent Number: 5,682,554
[45] Date of Patent: Oct. 28, 1997

[54] APPARATUS AND METHOD FOR HANDLING DATA TRANSFER BETWEEN A GENERAL PURPOSE COMPUTER AND A COOPERATING PROCESSOR

[75] Inventor: Chandlee B. Harrell, Mountain View, Calif.

[73] Assignee: Silicon Graphics, Inc., Mountain View, Calif.

[21] Appl. No.: 557,928

[22] Filed: Nov. 14, 1995

Related U.S. Application Data

[63] Continuation of Ser. No. 5,004, Jan. 15, 1993, abandoned.
[51] Int. Cl.$^6$ ................................................. G06F 13/00
[52] U.S. Cl. ...................... 395/877; 395/250; 395/200.13
[58] Field of Search .................................. 395/250, 877, 395/200.13

[56] References Cited

U.S. PATENT DOCUMENTS

| | | | |
|---|---|---|---|
| 4,062,059 | 12/1977 | Suzuki et al. | 395/250 |
| 4,208,713 | 6/1980 | Berg | 395/185.06 |
| 4,455,608 | 6/1984 | Suzuki et al. | 395/250 |
| 4,761,800 | 8/1988 | Lese et al. | 375/370 |
| 4,847,812 | 7/1989 | Lodhi | 365/221 |
| 4,860,193 | 8/1989 | Bentley et al. | 395/250 |
| 4,888,739 | 12/1989 | Frederick et al. | 365/221 |
| 5,003,463 | 3/1991 | Coyle et al. | 395/877 |
| 5,237,660 | 8/1993 | Weber et al. | 395/250 |
| 5,241,660 | 8/1993 | Michael et al. | 395/250 |
| 5,249,271 | 9/1993 | Hopkinson et al. | 395/377 |
| 5,261,076 | 11/1993 | Shamshirian | 395/500 |
| 5,377,184 | 12/1994 | Beal et al. | 370/231 |
| 5,390,299 | 2/1995 | Rege et al. | 395/250 |
| 5,473,756 | 12/1995 | Traylor | 395/250 |

Primary Examiner—William M. Treat
Assistant Examiner—Kenneth R. Coulter
Attorney, Agent, or Firm—Blakely, Sokoloff, Taylor & Zafman

[57] ABSTRACT

An apparatus in a computer system for handling data transfer between a first data processing system and a second data processing system is described. The apparatus includes a buffer for storing data received from the first system at a first data transfer rate and then transferred to the second system at a second data transfer rate. The buffer generates a first indication signal when substantially full and a second indication signal when substantially empty. A first counter counts a first predetermined time interval when receiving the first indication signal, and generates a third indication signal when reaching the first predetermined time interval. The first counter stops counting and returns to an initial state when not receiving the first indication signal. A second counter counts a second predetermined time interval when receiving the second indication signal, and generates a fourth indication signal when reaching the second predetermined time interval. The second counter stops counting and returns to the initial state when not receiving the second indication signal. A first logic causes the first system to delay sending the data to the buffer when the first counter receives the first indication signal to count toward the first predetermined time interval, and causes the first system to stop sending the data when the first counter generates the third indication signal. A second logic causes the second system to delay receiving the data from the buffer when the second counter receives the second indication signal to count toward the second predetermined time interval, and causes the second system to stop receiving the data when the second counter generates the fourth indication signal.

4 Claims, 5 Drawing Sheets

APPARATUS AND METHOD FOR HANDLING DATA TRANSFER BETWEEN A GENERAL PURPOSE COMPUTER AND A COOPERATING PROCESSOR

This is a continuation of application Ser. No. 08/005,004, filed Jan. 15, 1993, now abandoned.

FIELD OF THE INVENTION

The present invention pertains to the field of computer systems. More particularly, this invention relates to apparatus and a method for handling data transfer between a general purpose computer and a cooperating processor, such as a graphics processor, wherein the general purpose computer and the cooperating processor have different data transfer rates.

BACKGROUND OF THE INVENTION

A general purpose computer system often includes a co-processor which is coupled to the general purpose computer in order to function with the general purpose computer. An example of this may be found in the computer systems which produce graphics images (e.g. 3-dimensional graphics). Typically, a graphics computer system in the prior art includes a microprocessor based general purpose computer and a graphics processor coupled to the general purpose computer. The graphics processor is typically a specialized graphics processor which receives graphics instructions and data from the general purpose computer. The graphics processor then operates under control of the graphics instructions received from the general purpose computer and processes the data received from the general purpose computer. Therefore, the general purpose computer typically interacts with the graphics processor in a master/slave manner, wherein the general purpose computer acts as a master to drive the graphics processor as a slave via a bus that is coupled between the two components.

However, in such a graphics computer system, the general purpose computer and the graphics processor each is typically operating under an independent clock. In this case, the general purpose computer typically transfers data at its own data transfer rate (based on the system clock of the general purpose computer) and the graphics processor typically transfers data at its own data transfer rate (based on the clock of the graphics processor). Therefore, data transfer between the two components typically requires an interface that receives the data from the general purpose computer at the data transfer rate of the general purpose computer and sends the data to the graphics processor at the data transfer rate of the graphics processor. Typically a first-in-first-out buffer ("FIFO") is used as the interface.

Moreover, the graphics processor typically processes graphics data from the host processor (the general purpose computer) that includes a relatively large amount of "visual" data, resulting in relatively large or near infinite data burst size during data transfer. When this happens, the interface requires exception handling when having limited storage capacity. FIG. 1 typically illustrates a prior art arrangement for interfacing a general purpose computer with a graphics processor by a FIFO.

Referring to FIG. 1, a graphics computer system 10 is shown which includes a general purpose host computer 13 and a graphics processor 12. A FIFO 11 is coupled to host computer 13 and graphics processor 12 for transferring data between the two components. FIFO 11 has a limited storage capacity for storing data. FIFO 11 receives data from host computer 13 via line 19 at the data transfer rate controlled by the clock signal IN_CLK from host computer 13 via line 18. The data is then buffered in FIFO 11 and transferred to graphics processor 12 via line 17 at the data transfer rate controlled by the clock signal OUT_CLK from graphics processor 12 via line 16.

When FIFO 11 is full of data and has no room for any incoming data, FIFO 11 sends an interrupt signal to host computer 13 via line 14. This interrupt signal causes host computer 13 to interrupt its current data transfer cycle and stop further sending data to FIFO 11 via line 19. When FIFO 11 is empty, FIFO 11 sends an interrupt signal to graphics processor 12 via line 15. This interrupt signal then causes graphics processor 12 to interrupt its current data fetch cycle and stop receiving data from FIFO 11.

Disadvantages are, however, associated with this prior art arrangement. One disadvantage is that FIFO 11 needs to have very large storage capacity in order to ensure an efficient and fast data transfer between host computer 13 and graphics processor 12 with minimized interrupts to the two components. An ideal situation is to have an infinite storage capacity for FIFO 11. In this case, FIFO 11 will never be full or empty to interrupt either host computer 13 or graphics processor 12. A very large FIF0, however, is typically very complicated and costly. Moreover, a very large FIFO also occupies more space and consumes more power.

Another disadvantage of the prior art arrangement is that both host computer 13 and graphics processor 12 are subject to frequent interrupts even if the data transfer rates of the two components are not greatly mismatched. FIFO 11 interrupts host computer 13 whenever it is full and interrupts graphics processor 12 whenever it is empty. As is well known, when a computer or processor is interrupted, an interrupt exception routine is performed in the interrupted processor. For example, when host computer 13 is interrupted, it performs its interrupt exception routine. The interrupt exception routine typically involves polling the FULL flag of FIFO 11 to determine when the FIFO is not full. The frequent interrupts typically slow the data transfer between the two components and waste system resources on handling interrupt exception routines. Typically, when the data transfer rates of host computer 13 and graphics processor 12 are not greatly mismatched, FIFO 11 may only be full or empty for a very brief period of time.

SUMMARY AND OBJECTS OF THE INVENTION

One of the objects of the present invention is to provide apparatuses and methods for facilitating rapid data transfer between various processing systems having different data transfer rates.

Another object of the present invention is to provide apparatuses and methods for maximizing data transfer between various processing systems having different data transfer rates with maximum throughput and maximum performance for all the processing systems during the data transfer.

Another object of the present invention is to provide apparatuses and methods for maximizing data transfer between various processing systems having different data transfer rates, wherein the data is transferred from one processing system to another with minimum latency.

A further object of the present invention is to provide apparatuses and methods for cost effectively maximizing data transfer between various processing systems having different data transfer rates with minimum hardware overhead and minimum power consumption.

An apparatus in a computer system for handling data transfer between a first data processing system and a second data processing system is described. The apparatus includes a buffer coupled to the first and second systems for storing data received from the first system at a first data transfer rate and then transferred to the second system at a second data transfer rate. The buffer generates a first indication signal when substantially full and a second indication signal when substantially empty. A first counter is coupled to the buffer for counting a first predetermined time interval. The first counter starts counting when receiving the first indication signal. The first counter stops counting and returns to an initial state of the first counter when not receiving the first indication signal. A second counter is coupled to the buffer for counting a second predetermined time interval. The second counter starts counting when receiving the second indication signal. The second counter stops counting and returns to an initial state of the second counter when not receiving the second indication signal. A first logic means is coupled to (1) the first counter, (2) the buffer, and (3) the first system for causing the first system to delay sending data to the buffer (by asserting a first delay signal, such as a cycle stall) when the first counter receives the first indication signal, causing the first counter to count for the first predetermined time interval, and for causing the first system to stop sending the data when the first counter completes its count, indicating the first predetermined time interval is over, to thereby generate a third indication signal. The first logic means causes the first system to stop sending the data to the buffer when the first logic receives both the first and third indication signals. A second logic means is coupled to (1) the second counter, (2) the buffer, and (3) the second system for causing the second system to delay receiving the data from the buffer (by asserting a second delay signal, such as a cycle stall) when the second counter receives the second indication signal, causing the second counter to count for the second predetermined time interval, and for causing the second system to stop receiving the data when the second counter completes its count, indicating the second predetermined time interval is over, to thereby generate a fourth indication signal. The second logic means causes the second system to stop receiving the data from the buffer when the second logic receives both the second and fourth indication signals.

A method for handling data transfer between the first and second data processing systems is also described. The data received from the first system at a first data transfer rate and transferred to the second system at a second data transfer rate is stored in a buffer. A first indication signal is generated when the buffer is substantially full and a second indication signal is generated when the buffer is substantially empty. A first counter starts to count a first predetermined time interval when receiving the first indication signal from the buffer and generates a third indication signal at the end of the first predetermined time interval; while counting and while receiving the first indication signal, a first delay signal, such as a cycle stall, is generated. The first counter stops counting and returns to an initial state when not receiving the first indication signal. A second counter starts to count a second predetermined time interval when receiving the second indication signal from the buffering means and generates a fourth indication signal at the end of the second predetermined time interval; while counting and while receiving the second indication signal, a second delay signal, such as a cycle stall, is generated. The second counter stops counting and returns to the initial state when not receiving the second indication signal. The first system is caused to delay sending the data to the buffer when the buffer generates the first indication signal and the first counter is counting and to stop sending the data when the buffer generates the first indication signal and the first counter generates the third indication signal. The second system is caused to delay receiving the data from the buffer when the buffer generates the second indication signal and to stop receiving the data when the buffer generates the second indication signal and the fourth counter generates the fourth indication signal.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
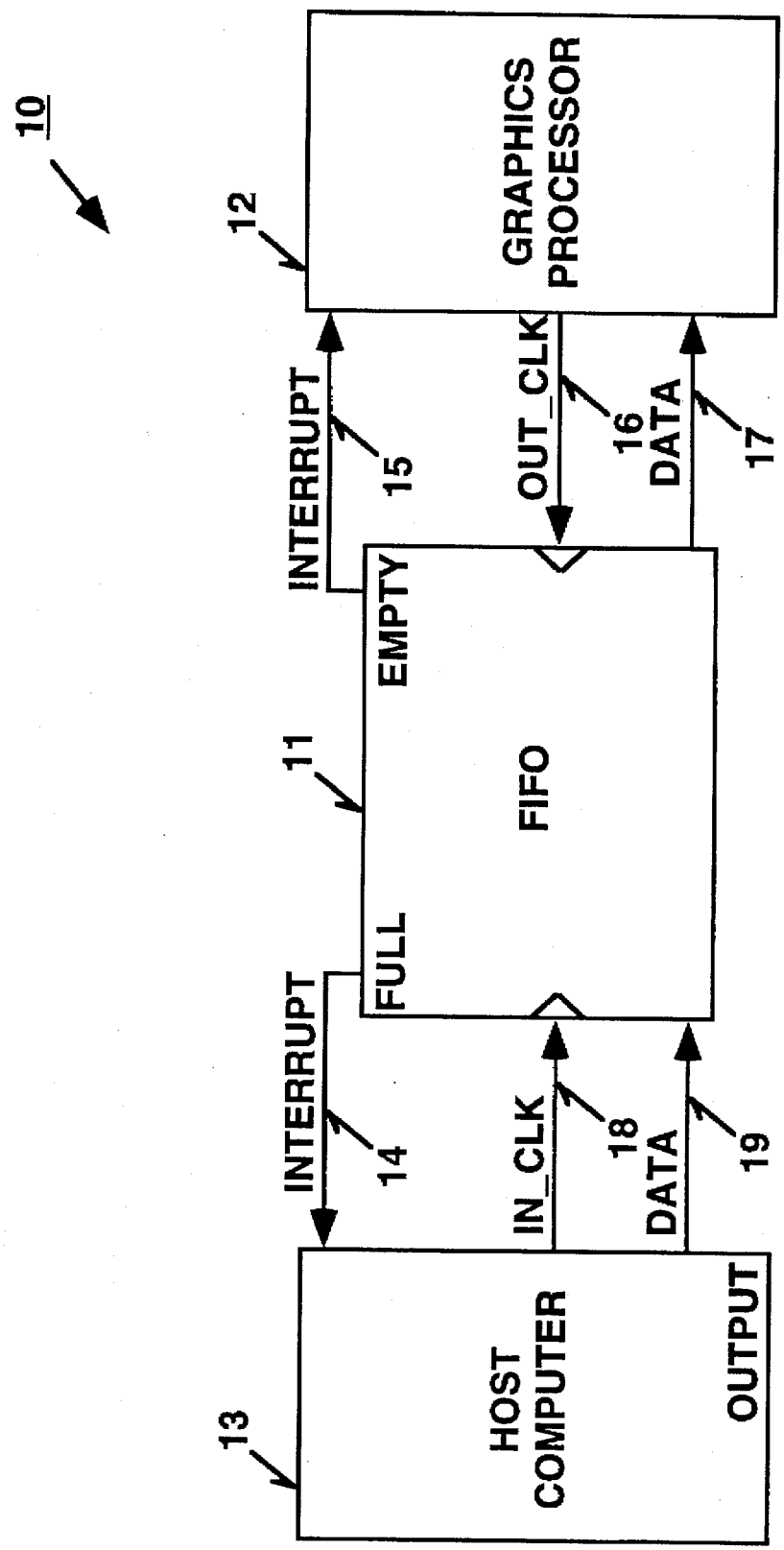
FIG. 1 is a block diagram of a prior art arrangement for handling data transfer between a general purpose host computer and a graphics processor of a computer system.
Figure 2:
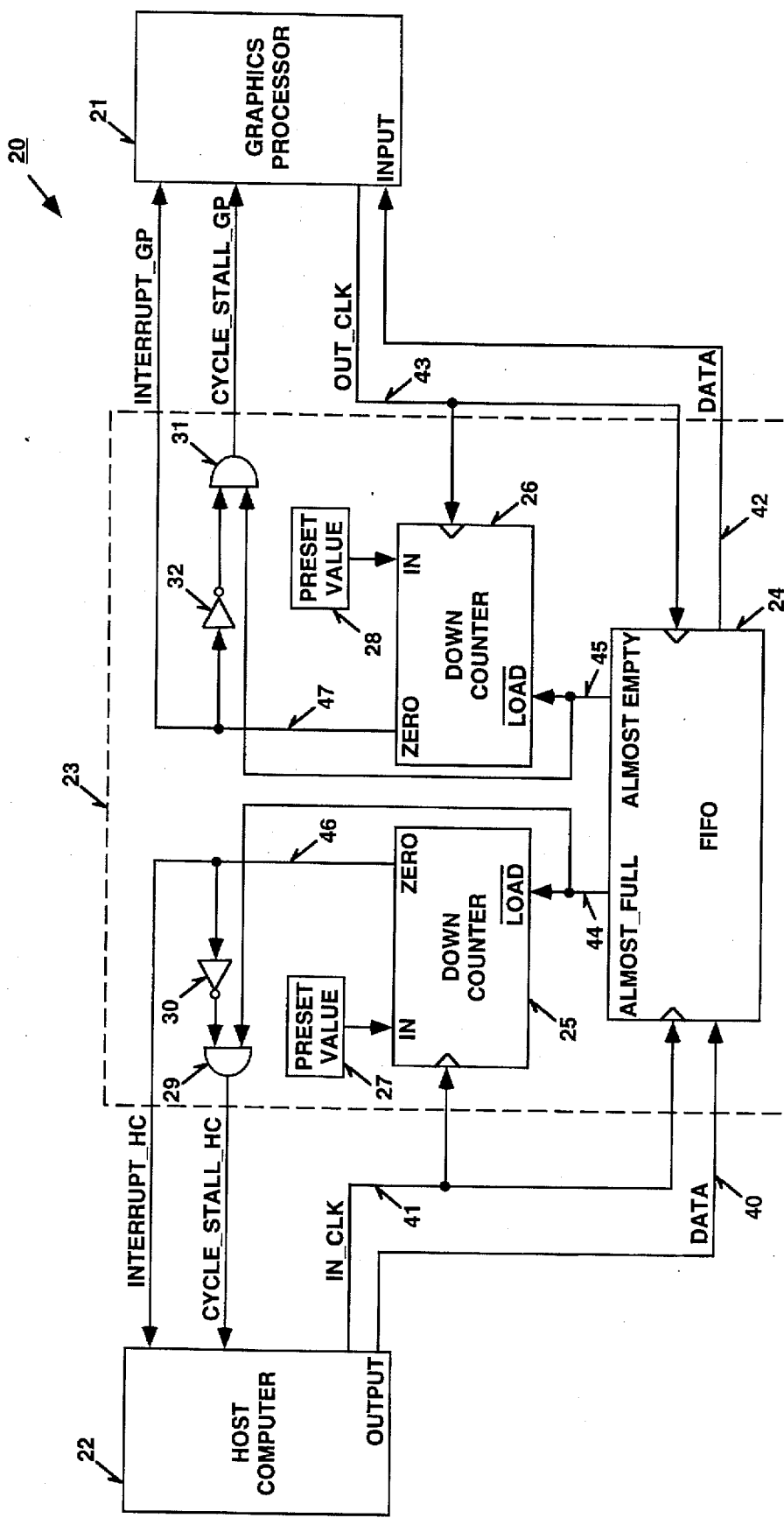
FIG. 2 is a block diagram of a scheme for handling data transfer between a general purpose host computer and a graphics processor of a computer system, according to one preferred embodiment of the present invention.

FIG. 2 schematically illustrates in block diagram form a computer system 20, which implements a preferred embodiment of the present invention.

In one embodiment, computer system 20 is a graphics computer system. In alternative embodiments, computer system 20 can be any other computer system that has different data transfer rates between various components of the system.

In FIG. 2, computer system 20 includes a general purpose host computer 22 and a graphics processor 21, according to a preferred embodiment of the present invention. In alternative embodiments, host computer 22 and graphics processor 21 can be any other data processing systems.

In computer system 20, host computer 22 acts as a master that passes instructions and data to graphics processor 21. Graphics processor 21 acts as a slave that operates on the instructions and data received from host computer 22. Graphics processor 21 handles graphics data and instructions at the control of host computer 22. Host computer 22 includes an independent clock signal and has a data transfer rate N in accordance with the clock signal of host computer 22. Graphics processor 21 also includes an independent clock signal and has a data transfer rate M in accordance with the clock signal of graphics processor 21. Therefore, data transfer between host computer 22 and graphics processor 21 requires an interface due to the different data transfer rates.

Coupled between host computer 22 and graphics processor 21 is an interface 23. The function of interface 23 is to maximize data transfer between host computer 22 and graphics processor 21 with minimum hardware and minimum interrupts to host computer 22 and graphics processor 21 such that maximum throughput and maximum performance for both host computer 22 and graphics processor 21 can be achieved, which will be described in detail below.

Interface 23 includes a FIFO 24. FIFO 24 is coupled to host computer 22 via lines 40 and 41 and to graphics processor 21 via lines 42 and 43. FIFO 24 receives data from host computer 22 via data lines 40. FIFO 24 also receives a clock signal IN_CLK from host computer 22 via line 41. The data that FIFO 24 receives typically includes both data and instructions. The IN_CLK signal controls FIFO 24 to receive the data from host computer 22 at the data transfer rate N of host computer 22.

The data received by FIFO 24 is then transferred to graphics processor 21 via data lines 42. FIFO 24 transfers the data to graphics processor 21 on a first-in-first-out basis. FIFO 24 also receives a clock signal OUT_CLK from graphics processor 21 via line 43. FIFO 24 transfers the data it receives from host computer 22 to graphics processor 21 under the control of the OUT_CLK signal. The OUT_CLK signal controls FIFO 24 to transfer the data to graphics processor 21 at the data transfer rate M of graphics processor 21. The read operation of FIFO 24 (i.e., sending data to graphics processor 21) can occur simultaneously with the write operation of FIFO 24 (i.e., receiving data from host computer 22). As is known in the art the FIFO includes a write enable input (for allowing a write operation into the FIFO to occur). It will also be appreciated that FIFO includes a read enable input which is controlled by a bus controller state machine similar to that shown in FIG. 5.

FIFO 24, as is known in the art, includes a plurality of storage locations, each storing one data entry. FIFO 24 includes an internal write pointer (not shown in FIG. 2) which points to the last entry or location written with the data from host computer 22. FIFO 24 also includes an internal read pointer (also not shown in FIG. 2) which indicates the last entry or location to be read from FIFO 24. FIFO 24 asserts its ALMOST_FULL flag signal when the write pointer of FIFO 24 is about to wrap around to equal to the read pointer of FIFO 24. FIFO 24 asserts its ALMOST_EMPTY flag signal when the read pointer of FIFO 24 is about to wrap around to equal to the write pointer of FIFO 24. The construction and operation of such a FIFO is known in the art.

In other words, when almost all the storage locations of FIFO 24 store data, FIFO 24 generates the ALMOST_FULL signal and when almost all the storage locations of FIFO 24 do not store data, FIFO 24 asserts its ALMOST_EMPTY flag signal.

In an alternative embodiment, FIFO 24 generates the ALMOST_FULL signal when it is full and generates the ALMOST_EMPTY signal when it is empty. In this embodiment, the interrupt handling routines which service the assertions of interrupt signals on line 46 must assure that data presently on the data bus 40 will be subsequently sent to the FIFO buffer 24 (in the case of an interrupt on line 46) once the FIFO is ready to receive further data (i.e., not FULL). This is because the data currently on the data bus immediately prior to the assertion of the interrupt signal will not be received by the FIFO after the assertion of the interrupt because the FIFO is full (unlike the circumstance when the FIFO generates an ALMOST_FULL signal). In the case of an assertion of interrupt signals on line 47, the interrupt handling routines must determine what data was retrieved from the FIFO 24 when the interrupt was asserted and ignore that data. This data is not valid and therefore should be ignored.

Interface 23 also includes down counters 25 and 26. Down counter 25 receives a preset value from a preset value register 27 at its IN data input. Down counter 25, when enabled for counting, counts down from the preset value to zero. Down counter 25 also receives the ALMOST_FULL signal at its LOAD bar input from FIFO 24 via line 44. Down counter 25 also receives the IN_CLK signal from host computer 22 via line 41. On each IN_CLK from line 41 (e.g. rising clock edge), down counter 25 loads the preset value from register 27 when the ALMOST_FULL signal applied at its LOAD bar input is deasserted; thus, when ALMOST_FULL is not asserted, counter 25 is prevented from counting down. The IN_CLK signal clocks the count down of down counter 25. When the ALMOST_FULL signal is asserted, down counter 25 starts down counting, which counting is clocked by the IN_CLK signal. When down counter 25 reaches zero from the preset value, counter 25 asserts its ZERO flag and generates an INTERRUPT_HC signal at its ZERO flag output. The INTERRUPT_HC signal is applied to host computer 22 via line 46. The INTERRUPT_HC signal interrupts host computer 22 in the conventional manner of interrupt processing and stops the current data transfer cycle of host computer 22.

Down counter 26 receives a preset value from a preset value register 28 at its IN data input. Down counter 26, when enabled to count, counts down from the preset value to zero. Down counter 26 also receives the ALMOST_EMPTY signal at its LOAD bar input from FIFO 24 via line 45. Down counter 26 also receives the OUT_CLK signal from graphics processor 21 via line 43. On each OUT_CLK from line 43 (e.g. rising clock edge), down counter 26 loads the preset value from register 28 when the ALMOST_EMPTY signal applied at its LOAD bar input is deasserted. The OUT_CLK signal clocks the countdown of down counter 26. When the ALMOST_EMPTY signal is asserted, down counter 26 starts down counting which counting is clocked by the OUT_CLK signal. When down counter 26 reaches zero from the preset value, counter 26 asserts its ZERO flag and generates an INTERRUPT_GP signal at its ZERO flag output. The INTERRUPT_GP signal is applied to graphics processor 21 via line 47. The INTERRUPT_GP signal interrupts graphics processor 21 in the conventional manner of interrupt processing and stops the current data transfer cycle of processor 21.

The preset value stored in register 27 determines the time interval at the end of which down counter 25 asserts its ZERO flag. The preset value stored in register 28 determines the time interval at the end of which down counter 26 asserts its ZERO flag. The preset values in registers 27 and 28 are user adjustable. In one embodiment, the preset values are programmed into registers 27–28, respectively.

Interface 23 includes an AND gate 29. AND gate 29 applies from its output a CYCLE_STALL_HC signal to host computer 22. AND gate 29 receives, at one of its inputs, the ALMOST_FULL signal from FIFO 24 in order to apply the CYCLE_STALL_HC signal to host computer 22. The CYCLE_STALL_HC signal causes host computer 22 to extend its bus cycle to throttle its data transfer to FIFO 24, which will be described in detail below.

The other input of AND gate 29 is from the ZERO flag output of down counter 25 via an inverter 30. This input of AND gate 29 from the ZERO flag output ensures that AND gate 29 stops generating the CYCLE_STALL_HC signal when down counter 25 counts to zero and interrupts host computer 22.

Interface 23 also includes an AND gate 31. AND gate 31 applies from its output a CYCLE_STALL_GP signal to graphics processor 21. AND gate 31 receives, at one of its inputs, the ALMOST_EMPTY signal in order to apply the CYCLE_STALL_GP signal to graphics processor 21. The CYCLE_STALL_GP signal causes graphics processor 21 to extend its bus cycle to throttle its data transfer from FIFO 24, which will be described in detail below.

The other input of AND gate 31 is from the ZERO flag output of down counter 26 via an inverter 32. This input of AND gate 31 from the ZERO flag of counter 26 ensures that AND gate 31 stops generating the CYCLE_STALL_GP signal when down counter 26 counts to zero and interrupts graphics processor 21.

In alternative embodiments, down counters 25 and 26 each may be any other type of counters or timers. For example, down counters 25–26 each can be a regular counter with a comparator coupled to compare the content in the counter with the preset value. When the counter counts to the preset value, the comparator asserts the ZERO flag to indicate that the counter has counted the preset value.

With the above-described arrangement of interface 23, a three-tier control mechanism for data transfer between host computer 22 and graphics processor 21 can be achieved. This three-tier control mechanism for data transfer of interface 23 maximizes data transfer and system performance for host computer 22 and graphics processor 21 when (1) the data transfer rate N of host computer 22 is very close to the data transfer rate M of graphics processor 21, (2) the data transfer rate N is neither close to nor greatly different from the data transfer rate M, and (3) the data transfer rate N is greatly different from the data transfer rate M. This will be described below in more detail. This three-tier control mechanism for data transfer of interface 23 ensures effective and maximized data exchange between host computer 22 and graphics processor 21 with minimum latency and minimum hardware overhead. This three-tier control mechanism will be described by referring to FIGS. 2 and 3.

The bottom tier of the three-tier control mechanism for data transfer of interface 23 involves FIFO 24 only, and is used when the data transfer rate N of host computer 22 is close to the data transfer rate M of graphics processor 21. In this case, FIFO 24 allows data to be written from host computer 22 at the data transfer rate N and data to be read to graphics processor 21 at the data transfer rate M. The read and write operations happen simultaneously and are done through separate ports. Since the data transfer rates N and M are close to each other, FIFO 24 maintains the data transfer between host computer 22 and graphics processor 21 without asserting either one of the ALMOST_FULL and ALMOST_EMPTY signals. Moreover, because of the fine grain rate matching of the two data transfer rates N and M, FIFO 24 only requires relatively small FIFO depth (i.e., storage capacity) to buffer data. Thus, the bottom tier control mechanism for data transfer allows data transfer between host computer 22 and graphics processor 21 to be optimized with maximum system performance and minimum hardware overhead when the two rates are close to each other.

Figure 3A:
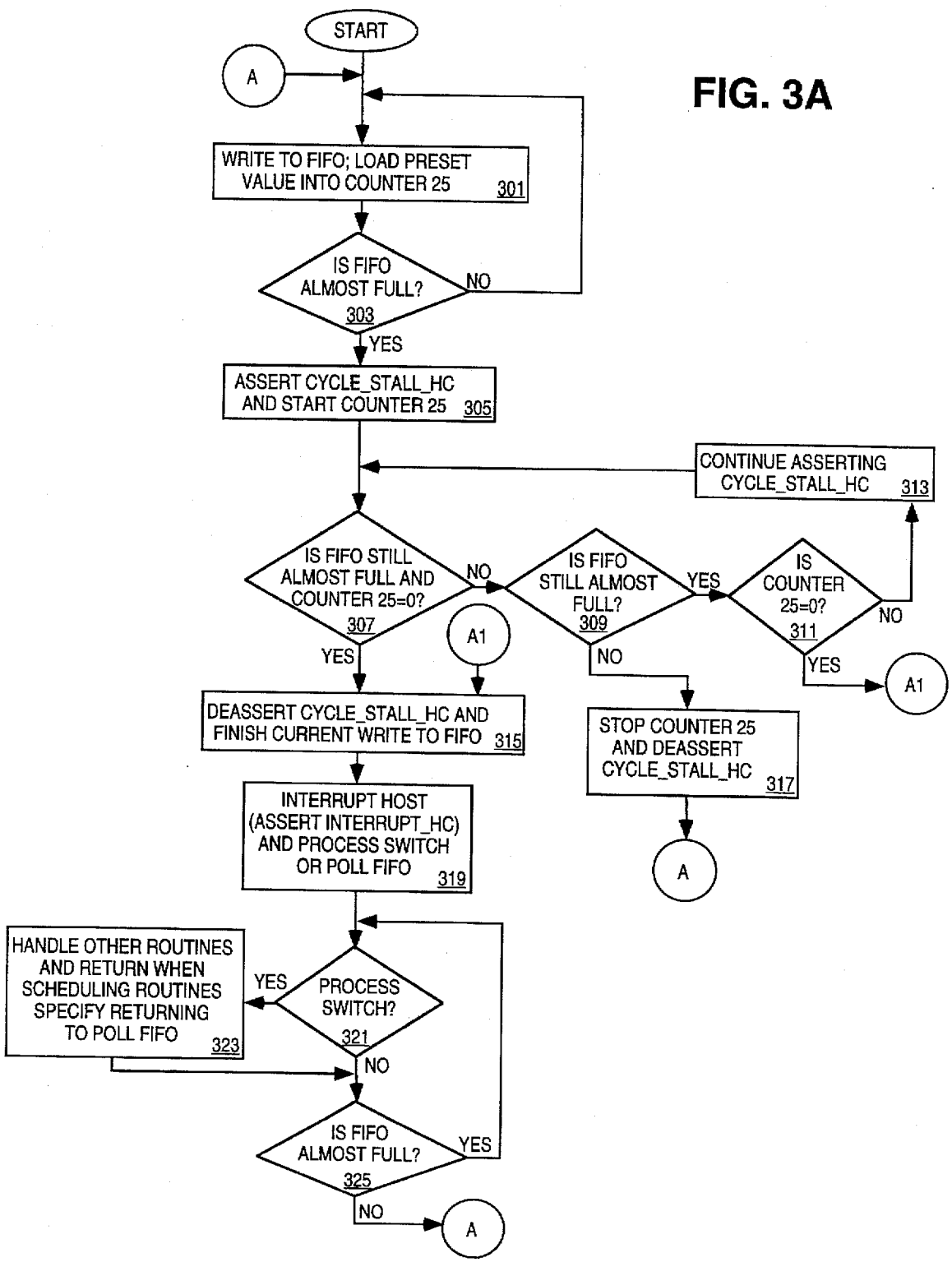
FIGS. 3a and 3b are flowcharts showing the operation of the method of the invention.
Figure 3B:
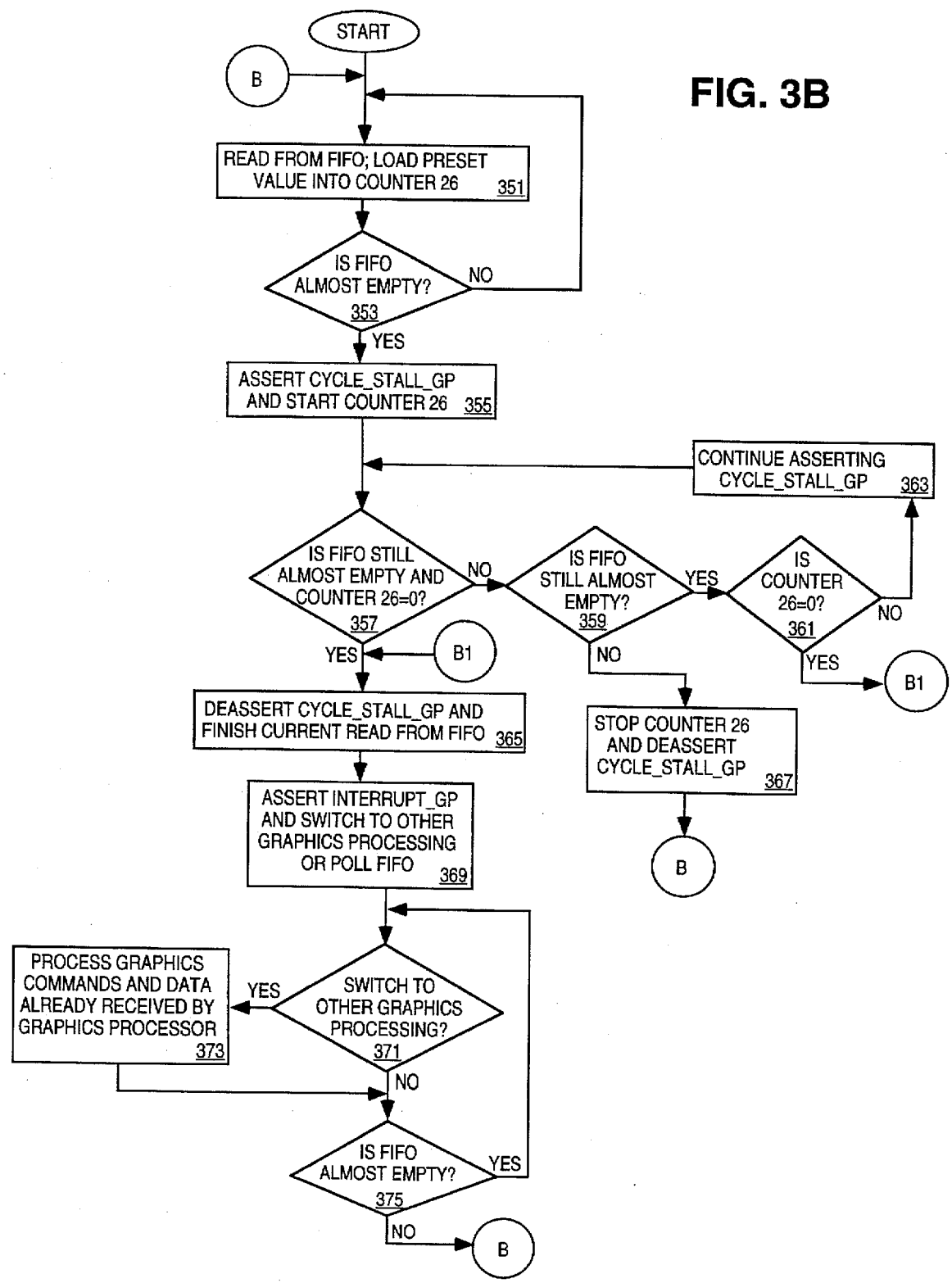

FIG. 3a shows the bottom tier control mechanism (for writing into FIFO 24) in steps 301 and 303, where processing continually loops between these steps as long as the ALMOST_FULL signal is not asserted. Similarly, FIG. 3b shows the bottom tier control mechanism (for reading from FIFO 24) in steps 351 and 353, where processing continually loops between these steps as long as the ALMOST_EMPTY signal is not asserted. It should be noted that FIGS. 3a and 3b are provided for illustration purposes only and should not be taken to literally describe steps taken by the logic of FIG. 2 when it is clear that this logic is performing in one operation what are shown as several steps in the flowcharts.

The second tier of the three-tier control mechanism for data transfer of interface 23 occurs when the data transfer rate N of host computer 22 is neither close to nor greatly different from the data transfer rate M of graphics processor 21. At this tier, the data transfer rate N and the data transfer rate M are caused to be matched to maximize the data transfer between host computer 22 and graphics processor 21. This second tier control mechanism for data transfer of interface 23 involves matching the data transfer rates N and M, independent of the memory size of FIFO 24, such that the maximum data transfer can be achieved without frequently interrupting either of host computer 22 and graphics processor 21. This second tier control mechanism for data transfer is achieved by using down counters 25–26, which is described in detail below.

If, for example, the data transfer rate N of host computer 22 is greater than but not greatly greater than the data transfer rate M of graphics processor 21, FIFO 24 will be substantially full and asserts the ALMOST_FULL flag signal. The asserted ALMOST_FULL signal then causes AND gate 29 to apply the CYCLE_STALL_HC signal to host computer 22, given that the ZERO flag of down counter 25 is not asserted at this time. This is shown in steps 303 and 305 of FIG. 3a, where step 303 proceeds to step 305 because ALMOST_FULL is asserted. The active CYCLE_STALL_HC signal then causes host computer 22 to delay its data transfer to FIFO 24 and to extend its data transfer bus cycle. This is shown in FIG. 3a, where processing moves from step 303 to step 305. Host computer 22, using known bus protocols for extending (delaying) a writing bus cycle, delays its data transfer to FIFO 24 as long as the CYCLE_STALL_HC is active. However, the time interval within which host computer 22 can hold its data transfer depends on down counter 25. The stalling of a bus cycle will be described below in more detail. As shown in steps 307, 309, 311 and 313, the system keeps asserting CYCLE_STALL_HC while counter 25 continues to down count and while ALMOST_FULL is still asserted. It should be noted that the decision in step 311 also tests whether the FIFO is still almost full (if not almost full, the processing shifts to step 317).

When the ALMOST_FULL signal is asserted, it also causes down counter 25 to start down counting from the preset value loaded from register 27. The asserted ALMOST_FULL signal allows down counter 25 to continue down counting toward zero. When the ALMOST_FULL signal is deasserted (i.e., FIFO 24 is no longer almost full), down counter 25 stops down counting and reloads the preset value from register 27 on the next IN_CLK. This is shown in FIG. 3a when processing progresses from step 309 to step 317. The preset value from which down counter 25 starts down counting specifies the range where the data transfer rate N can be greater than but not greatly greater than the data transfer rate M, which is a performance consideration of the system designer. The criteria for selecting a preset value will be described below.

Because the data transfer rate N of host computer 22 is not greatly greater than the data transfer rate M of graphics processor 21, graphics processor 121 can read an entry from FIFO 24 (i.e., fetches one data entry from FIFO 24) before down counter 25 reaches zero. In this case, the ALMOST_FULL signal goes deasserted before down counter 25 reaches zero, causing the CYCLE_STALL_HC signal to be deasserted to host computer 22. This occurs in proceeding from step 309 to step 317. Host computer 22 then is allowed to write an entry to FIFO 24 (i.e., host 22 transfers data to FIFO 24 during a write bus cycle over data lines 40).

Meanwhile, the deasserted ALMOST_FULL signal stops down counter 25 and allows down counter 25 to reload the preset value. When Cycle_Stall is deasserted at this point, a data write occurs to FIFO 24. When host computer 22 finishes writing an entry to FIFO 24, the ALMOST_FULL signal is again asserted (assuming that N>M because the interface 23 is operating in the middle tier of the three-tier control mechanism for data transfer), and that again causes the CYCLE_STALL_HC signal to be asserted and down counter 25 to start another down counting cycle. In this manner, the data transfer rate N of host computer 22 is throttled down to the data transfer rate M of graphics processor 21. In this case, FIFO 24 can be made small while the data transfer between host computer 22 and graphics processor 21 has minimum latency.

Figure 4:
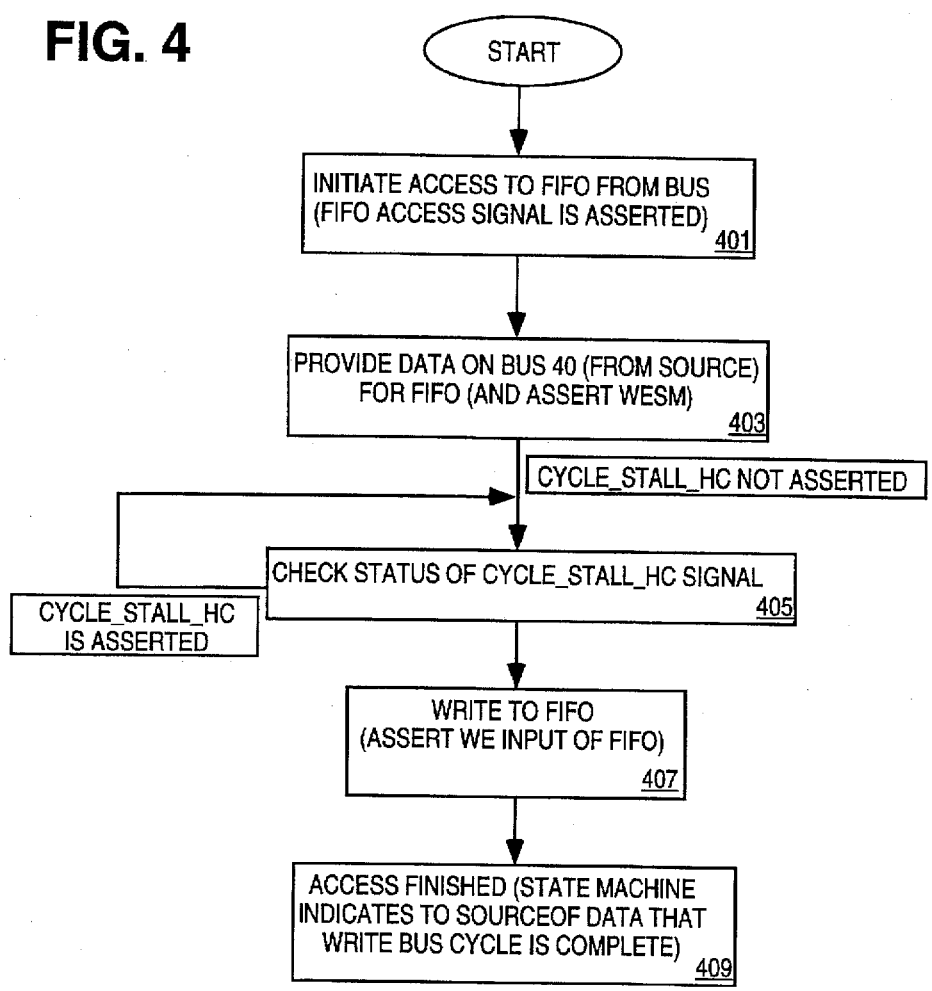
FIG. 4 shows a flowchart which depicts the operation of a state machine which controls the cycle stalling which occurs when the buffer is almost full or almost empty but an interrupt is not asserted.
Figure 5:
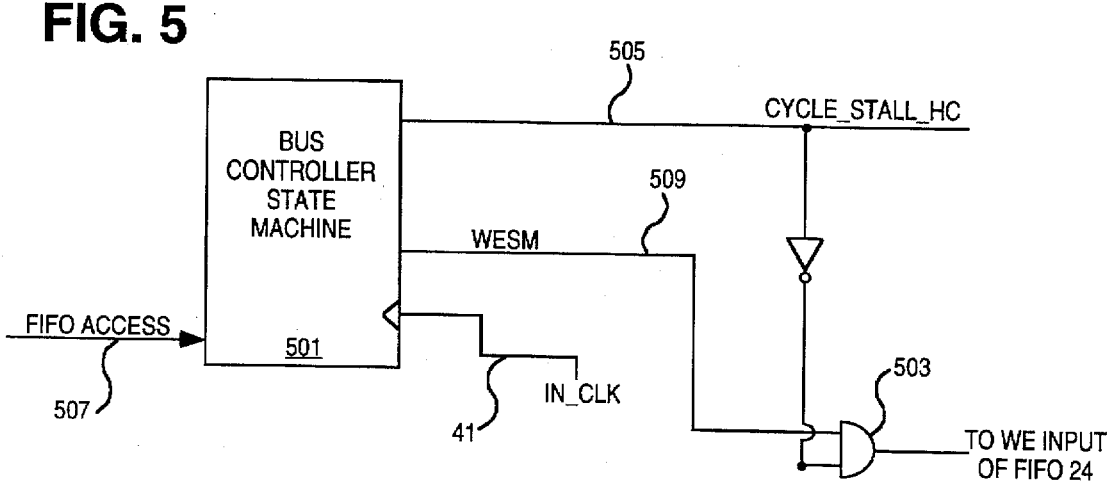
FIG. 5 shows a bus control state machine which controls the cycle stalling.

FIGS. 4 and 5 illustrate the operation of the invention in response to the CYCLE_STALL_HC signal (it will be appreciated that the CYCLE_STALL_GP signal causes a similar operation on the graphics processor side of the interface 23). FIG. 4 shows the process of checking for the CYCLE_STALL_HC signal each time a write operation occurs to the FIFO, and FIG. 5 shows the bus controller state machine 501 which receives the CYCLE_STALL_HC signal (from line 505) and controls the writing to FIFO 24 by controlling the write enable input to the FIFO 24. The state machine 501 also receives the IN_CLK signal on line 41 and this clock signal operates as the state machine's clock. The state machine 501 also receives a signal on line 507 which indicates that an access (a writing operation) is occurring; this signal may be an address strobe signal or a write enable (WE) signal from the source of the data. The state machine 501 provides an output on line 509 which is a write enable SM (WESM) signal. The machine 501 generates the WESM signal when a FIFO Access is requested (by asserting FIFO Access on line 507). Line 509 and the inverted signal on line 505 are inputs to AND gate 503, the output of which is coupled to the WE input of FIFO 24. If CYCLE_STALL_HC is asserted, then the inverter inverts the signal on line 505 and thereby prevents the AND gate 503 from having a logic high (which is assumed for an active Write Enable) and thus, WE to the FIFO 24 cannot be asserted when CYCLE_STALL_HC is asserted. If CYCLE_STALL_HC is not asserted then the output of AND gate 503 will be controlled by the state of line 509 such that the WE input to FIFO 24 will be asserted whenever WESM is asserted. The operation of state machine 501 is shown in FIG. 4 and begins when an access is initiated (which is indicated by the assertion of the FIFO access signal on line 507 which is an input to the state machine 501). This occurs in step 401 when the FIFO Access signal is asserted by the device sending the data to the FIFO (the source of the data). Then, in step 403, the data is provided on the bus 40 by the source of the data and the machine 501 asserts the WESM signal on line 509. Then, in step 405, the status of the CYCLE_STALL_HC signal is checked in the sense that if the signal is asserted, then WE to FIFO cannot be asserted and consequently no writing to FIFO 24 can occur (this is shown in FIG. 4 as step 405 continually repeats itself); if the signal is not asserted, then, in step 407, the WE signal from AND gate 503 is asserted and data on bus 40 is written to FIFO 24. After step 407, the state machine, in step 409, indicates (by one of its outputs) to the source of data that the write bus cycle has been completed; this typically occurs by sending a signal to the source that indicates that the access is complete or a similar signal or a data strobe acknowledge signal. These signals are often conventional bus protocol signals for indicating the end of a bus transaction. As noted above, the assertion of the CYCLE_STALL_GP causes the operation of a process similar to that shown in FIG. 4 with an apparatus similar to that shown in FIG. 5. In particular, the operation and apparatus is similar except that the output of the AND gate 503 will be coupled to the Read Enable input of the FIFO 24, and the line 509 will provide a Read Enable SM (RESM) signal from the state machine whenever a read request (to read FIFO 24) is received from the graphics processor 21, and this read request is the input on line 507 to the state machine. Of course, the line 505 will receive the CYCLE_STALL_GP signal and the clock input of the state machine will receive the OUT_CLK signal. Naturally, step 401 will initiate a read of FIFO 24 by asserting a read request and in step 403, RESM will be asserted. If CYCLE_STALL_GP is not asserted then the read enable for FIFO 24 will be asserted and data will be read from the FIFO. In the case of the Graphic processor, there is no need to indicate to the FIFO in step 409 that the access is finished.

If the data transfer rate M of graphics processor 21 is greater than but not greatly greater than the data transfer rate N of host computer 22, FIFO 24 will be substantially empty and asserts the ALMOST_EMPTY flag signal. Interface 23 then performs the data throttle operation for graphics processor 21 using down counter 26, which is identical to the data throttle operation for host processor 22 described above. The data throttle operation for graphics processor 21 will be described below briefly. This data throttle operation matches the data transfer rate M of graphics processor 21 to the data transfer rate N of host computer 22.

The ALMOST_EMPTY signal causes the CYCLE_STALL_GP signal to be asserted to graphics processor 21, halting its data transfer from FIFO 24 and extending its data transfer bus cycle. This is shown in FIG. 3b as it is determined in step 353 that the FIFO is almost empty and thus, in step 355, CYCLE_STALL_GP is asserted and counter 26 starts counting down. Down counter 26 starts to down count from the preset value loaded from register 28. Like the preset value for down counter 25, the preset value for down counter 26 also specifies the range where the data transfer rate M can be greater than but not greatly greater than the data transfer rate N.

Host computer 22 will write an entry to FIFO 24 before down counter 26 reaches zero. When this happens, FIFO 24 deasserts the ALMOST_EMPTY signal, which stops down counter 26 and deasserts the CYCLE_STALL_GP signal applied to graphic processor 21. As shown in FIG. 3b, this occurs as processing proceeds from step 359 to step 367, where in step 359 the writing of an entry into FIFO 24 is determined by the absence of the ALMOST_EMPTY signal, causing step 367 to be performed. Graphics processor 21 then is allowed to read one entry from FIFO 24, making the ALMOST_EMPTY signal asserted again. The next cycle bus repeats, throttling the data transfer rate M to the data transfer rate N. As shown in FIG. 3b in steps 357, 359, 361, and 363, these steps show that the interface 23 continually circulates through these steps while counting down until the ALMOST_EMPTY signal is deasserted when the host writes to FIFO 24 before the counter 26 can count down from its preset value.

As described above, the preset value in register 25 specifies the rate matching range within which the data transfer rate N can be throttled to the data transfer rate M while the preset value in register 26 specifies the rate matching range within which the data transfer rate M can be throttled to the data transfer rate N.

The preset values stored in registers 27 and 28 are determined on the basis of several parameters in the system. The two major parameters for register 27 are (a) the average number of clock cycles between reads of the FIFO by the graphics processor 21 (e.g. the average number of clock cycles between reading of graphics primitives from FIFO 24) and (b) the maximum amount of time (measured in the number of clock cycles) that a bus cycle can be stalled on the bus 40 (before the bus protocols for the bus 40 will force a time out or some other performance penalty). Of course, the clock cycles should be measured with the same clock (e.g. either the IN_CLK or OUT_CLK). The preset value should be set so that its value is between the average number of clock cycles between reads of the FIFO (which should establish a minimum value for the preset value) and the maximum amount of clock cycles that the bus 40 can be stalled before a penalty (which should establish a maximum value for the preset value). In a particular embodiment, the average number of clock cycles between reads of FIFO 24 is 100 or less IN_CLKs, and the maximum amount of clock cycles that bus 40 can be stalled is 150 IN_CLKs; thus, in this example, the preset value for register 27 is set as a value between 100 and 150. For register 28, the parameters are (a) the average number of clock cycles between writes to FIFO 24 and (b) the maximum amount of time that the receiving bus 42 can be stalled (before the bus protocols for bus 42 will force a time out or some other similar performance penalty). The preset value for register 28 is set to be between these two parameters.

The third tier of the three-tier control mechanism for data transfer of interface 23 handles the situations where the data transfer rates N and M are greatly mismatched (i.e., N>>M or M>>N). This is shown in the bottom portions of FIGS. 3a and 3b below steps 307 and 357 respectively. For such cases, FIFO 24 becomes full or empty quickly and a prolonged bus cycle to either host computer 22 or graphics processor 21 is no longer appropriate. This is because the two rates N and M are greatly mismatched. In order to match the rates, the processor with the faster data transfer rate has to have a very long bus cycle stall. This seriously affects the performance of the device, and results in the waste of the system resources.

The third tier of the three-tier control mechanism for data transfer of interface 23 provides the solution to the situation. When the data transfer rate N is greatly greater than the data transfer rate M, FIFO 24 asserts the ALMOST_FULL signal to down counter 25 causing counter 25 to reach zero and graphics processor 21 cannot read an entry from FIFO 24 before down counter 25 reaches zero. This is shown in FIG. 3a when the operation of interface 23 progresses from step 301 to step 303 (where it is determined that ALMOST_FULL is asserted) to step 305 (where CYCLE_STALL_HC is asserted and continues to be asserted while the counter 25 counts down to and reaches zero before the ALMOST_FULL clears) and then to step 307 (in which it is determined that ALMOST_FULL is still asserted and the counter 25 has reached zero). In this case at step 307, the operation proceeds to step 315 in which CYCLE_STALL_HC is deasserted and the current write operation is finished. Note that as soon as CYCLE_STALL_HC is deasserted, the WE output from gate 503 of FIG. 5 will become asserted allowing a write to FIFO 24, which will be a write of the last data from bus 40 which existed on the bus in the last write cycle which was stalled. It will be appreciated that, during this third tier, prior to reaching step 315, the interface 23 will typically cycle through steps 309, 311 and 313 (followed by step 307) as the counter 25 continues to count down while ALMOST_FULL remains asserted.

When down counter 25 reaches zero, it asserts its ZERO flag which deasserts the CYCLE_STALL_HC signal applied to host computer 22, and in step 319 the INTERRUPT_HC signal is sent to host computer 22. The INTERRUPT_HC signal then causes host computer 22 to execute the conventional interrupt handling routines, thereby interrupting its current data transfer. During the interrupt, host computer 22 executes its conventional interrupt routine that includes appropriate exception handling such as switching to a new process or polling FIFO 24 to determine if the ALMOST_FULL signal is deasserted. Steps 321, 323 and 325 show the typical process for handling the interrupt from interface 23. In step 321, the system (typically the host computer's operating system) determines whether a process switch (i.e. switching of processing to a task other than data writing to FIFO 24) is appropriate; this is typically managed by the conventional operating system (e.g. UNIX) process handling routines, which assign a task/process identification (ID) to each task/process often with a priority for the task/process, and the tasks/processes operating within the system are "scheduled" for execution by the host computer 22. If the operating system determines that a process switch should occur, then other tasks/processes are executed in step 323 (again according the conventional operating system task scheduling procedures) and when the scheduling routines specify returning to the process of writing data to FIFO 24, then processing proceeds to step 325. If a process switch is not selected in step 321 then step 325 follows step 321. In step 325, the system polls FIFO 24 by checking the status of the ALMOST_FULL signal. If the FIFO is no longer ALMOST_FULL then processing returns (via node A) to step 301; otherwise (FIFO is still ALMOST_FULL) processing loops back to step 321.

Similarly, when the data transfer rate M is greatly greater than the data transfer rate N, FIFO 24 asserts the ALMOST EMPTY signal to down counter 26 causing counter 26 to reach zero. Moreover, because the data transfer rate M is greatly greater than the data transfer rate N, host computer 22 cannot write an entry to FIFO 24 before down counter 26 reaches zero. This is shown in FIG. 3b when the operation of interface 23 progresses from step 351 to step 353 (where it is determined that ALMOST_EMPTY is asserted) to step 355 (where CYCLE_STALL_GP is asserted and continues to be asserted while the counter 26 counts down to and reaches zero before the ALMOST_EMPTY clears) and then to step 357 (in which it is determined that ALMOST_ EMPTY is still asserted and the counter 26 has reached zero). In this case at step 357, the operation proceeds to step 365 in which CYCLE_STALL_GP is deasserted and the current read operation is finished. Note that as soon as CYCLE_STALL_GP is deasserted, the Read Enable output from gate 503 of FIG. 5 will become asserted allowing a read from FIFO 24, which will be a read of the last data from FIFO which existed on the bus in the last read cycle which was stalled. It will be appreciated that, during this third tier, prior to reaching step 365, the interface 23 will typically cycle through steps 359, 361 and 363 (followed by step 357) as the counter 26 continues to count down while ALMOST_ EMPTY remains asserted.

When down counter 26 reaches zero, it asserts its ZERO flag which stops extending the current data transfer bus cycle of graphics processor 21 and in step 369 interrupts the graphics processor by asserting the INTERRUPT_GP signal. The interrupted graphics processor 21 then runs its conventional interrupt routine to poll FIFO 24 or to switch to other graphics processes (in which graphics commands and data already received by graphics processor, via FIFO 24, are processed). When the interrupt routine determines that the ALMOST EMPTY signal is deasserted after the interrupt of graphics processor 21, the data transfer may be resumed.

In alternative embodiments, interface 23 may be used for other master/slave operated data processing systems that have unmatched data transfer rates between the master system and the slave system. The unmatched data transfer rates may be caused due to the fact that the data processing systems may have variable length data bursts and long data bursts and due to the fact that the two processing systems produce and receive data at different rates.

Hence, the three-tier control mechanism for data transfer of interface 23 ensures that maximized data transfer is achieved with minimum interrupt, minimum data latency, and minimum hardware overhead. The first tier of control for data transfer involves FIFO 24. The FIFO depth of FIFO 24 is chosen based on the typical expected burst size of the faster system. When the data transfer rates N and M are close to each other, the first tier control mechanism for data transfer allows host computer 22 to fill in FIFO 24 at the data transfer rate N and graphics processor 21 to empty FIFO 24 at the data transfer rate M, achieving maximum throughput and maximum performance of host computer 22 and graphics processor 21.

When the data transfer rates N and M are not close to each other while not greatly different from each other, the second tier control mechanism for data transfer matches the two rates N and M by throttling the faster system to the data transfer rate of the slower system, thus eliminating interrupts to either of host computer 22 and graphics processor 21. This second tier control mechanism for data transfer also allows the FIFO depth of FIFO 24 to be small, reducing the hardware.

The third tier control mechanism for data transfer handles the situations where the data transfer rates N and M are greatly mismatched. The third tier control mechanism for data transfer interrupts the faster system when FIFO 24 becomes substantially full or empty to match the data transfer between host computer 22 and graphics processor 21. This also requires minimum hardware overhead.

The following are equations for evaluating the performance of the three-tier control mechanism for data transfer of interface 23. When N>M,

---

DT_CM (transfers/sec) = M − 1 × (i × M − D)  when (i × M − D) > 0
DT_CM (transfers/sec) = M  when (i × M − D) ≦ 0

--- wherein

N=data transfer rate of host computer 22
M=date transfer rate of graphics processor 21
D=depth of FIFO in number of entries
I=number of interrupts/sec
i=interrupt latency in second, defined as latency from when FIFO 24 is no longer full to the point when the faster system is again reading or writing data.

As can be seen from the above, the maximum or ideal transfer rate M can be achieved by I=0, by i=0, or by (i×M−D)≦0. For a general purpose computer, i is typically quite large, resulting in (i×M−D) usually being greater than zero. This invention puts forward the solution which brings I=0, eliminating interrupts.

When M>N, we can obtain identically mirrored equations to that shown above and come to the solution of bringing I=0.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus in a computer system having a first and a second data processing system for handling data transfer between the first and second systems, comprising:

(A) a buffer coupled to the first and second systems, the buffer storing data received from the first system at a first data transfer rate and transferred to the second system at a second data transfer rate, wherein the buffer asserts a first indication signal when substantially full and a second indication signal when substantially empty;

(B) a first control logic coupled to the buffer and the first system, the first control logic (1) extending a first data transfer cycle from the first system to the buffer which is set by the first data transfer rate for as long as the first indication signal remains asserted up to a first predetermined time interval without interrupting the first system when the first indication signal is asserted, and (2) ending the extended first data transfer cycle and interrupting the first system to stop further data transfer from the first system to the buffer if the first indication signal remains asserted at the end of the first predetermined time interval, wherein a first datum is transferred from the first system to the buffer during the extended first data transfer cycle, wherein the first control logic comprises:

(a) a first counter coupled to the buffer, wherein the first counter starts counting when receiving the first indication signal, and stops counting and returns to an initial state of the first counter when not receiving the first indication signal;

(b) a first logic coupled to (1) the first counter, (2) the buffer, and (3) the first system for causing the first system to delay sending the first datum to the buffer when the first counter receives the first indication signal to count toward a first value representing the first predetermined time interval, and for causing the first system to finish sending the first datum and to stop further data transfer to the buffer when the first counter reaches the first value representing the first predetermined time interval to generate a third indication signal, wherein the first logic receives the first indication signal from the buffer and the third indication signal from the first counter; and (C) a second control logic coupled to the buffer and the second system, the second control logic (1) extending a second data transfer cycle from the buffer to the second system which is set by the second data transfer rate for as long as the second indication signal remains asserted up to a second predetermined time interval without interrupting the second system when the second indication signal is asserted, and (2) ending the extended second data transfer cycle and interrupting the second system to stop further data transfer from the buffer to the second system if the second indication signal remains asserted at the end of the second predetermined time interval, wherein a second datum is transferred from the buffer to the second system during the extended second data transfer cycle.

2. An apparatus in a computer system having a first and a second data processing system for handling data transfer between the first and second systems, comprising:

(A) a buffer coupled to the first and second systems, the buffer storing data received from the first system at a first data transfer rate and transferred to the second system at a second data transfer rate, wherein the buffer asserts a first indication signal when substantially full and a second indication signal when substantially empty;

(B) a first control logic coupled to the buffer and the first system, the first control logic (1) extending a first data transfer cycle from the first system to the buffer which is set by the first data transfer rate for as long as the first indication signal remains asserted up to a first predetermined time interval without interrupting the first system when the first indication signal is asserted, and (2) ending the extended first data transfer cycle and interrupting the first system to stop further data transfer from the first system to the buffer if the first indication signal remains asserted at the end of the first predetermined time interval, wherein a first datum is transferred from the first system to the buffer during the extended first data transfer cycle; and (C) a second control logic coupled to the buffer and the second system, the second control logic (1) extending a second data transfer cycle from the buffer to the second system which is set by the second data transfer rate for as long as the second indication signal remains asserted up to a second predetermined time interval without interrupting the second system when the second indication signal is asserted, and (2) ending the extended second data transfer cycle and interrupting the second system to stop further data transfer from the buffer to the second system if the second indication signal remains asserted at the end of the second predetermined time interval, wherein a second datum is transferred from the buffer to the second system during the extended second data transfer cycle, wherein the second control logic comprises:

(i) a counter coupled to the buffer, wherein the counter starts counting when receiving the second indication signal, and stops counting and returns to an initial state of the counter when not receiving the second indication signal;

(ii) a second logic coupled to (1) the counter, (2) the buffer, and (3) the second system for causing the second system to delay receiving the second datum from the buffer when the counter receives the second indication signal to count toward a second value representing the second predetermined time interval and for causing the second system to finish receiving the second datum and to stop further data transfer from the buffer when the counter reaches the second value representing the second predetermined time interval to generate a third indication signal, wherein the second logic receives the second indication signal from the buffer and the third indication signal from the counter.

3. A method for handling data transfer between a first and a second data processing system of a computer system, comprising the steps of:

(A) storing data received from the first system at a first data transfer rate and transferred to the second system at a second data transfer rate in a buffer;

(B) asserting a first indication signal when the buffer is substantially full and a second indication signal when the buffer is substantially empty;

(C) counting toward a first value that represents a first predetermined time interval in a first counter when the first counter receives the first indication signal and generating a third indication signal when the first counter reaches the first value representing the first predetermined time interval, wherein the first counter stops counting and returns to an initial state of the first counter when not receiving the first indication signal;

(D) counting toward a second value that represents a second predetermined time interval in a second counter when the second counter receives the second indication signal and generating a fourth indication signal when the second counter reaches the second value representing the second predetermined time interval, wherein the second counter stops counting and returns to an initial state of the second counter when not receiving the second indication signal;

(E) causing the first system (1) to extend a first data transfer cycle from the first system to the buffer and set by the first data transfer rate for as long as the first indication signal remains asserted up to a first predetermined time interval without interrupting the first system when the first indication signal is asserted, and (2) to end the extended first data transfer cycle and interrupt the first system to stop further data transfer to the buffer if the first indication signal remains asserted at the end of the first predetermined time interval;

(F) causing the second system (1) to extend a second data transfer cycle from the buffer to the second system and set by the second data transfer rate for as long as the second indication signal remains asserted up to a second predetermined time interval without interrupting the second system when the second indication signal is asserted, and (2) to end the extend second data transfer cycle and interrupt the second system to stop further data transfer to the second system if the second indication signal remains asserted at the end of the second predetermined time interval.

4. The method of claim 3, wherein the first and second predetermined time intervals each is programmable.

* * * * *